US011137600B2

(12) United States Patent
Yamasaki et al.

(10) Patent No.: US 11,137,600 B2
(45) Date of Patent: Oct. 5, 2021

(54) DISPLAY DEVICE, DISPLAY CONTROL METHOD, AND DISPLAY SYSTEM

(71) Applicant: HITACHI, LTD., Tokyo (JP)

(72) Inventors: Koji Yamasaki, Tokyo (JP); Chiyo Ohno, Tokyo (JP); Shoji Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/752,282

(22) Filed: Jan. 24, 2020

(65) Prior Publication Data

US 2020/0301144 A1 Sep. 24, 2020

(30) Foreign Application Priority Data

Mar. 19, 2019 (JP) ................. JP2019-51286

(51) Int. Cl.
*G02B 27/01* (2006.01)
(52) U.S. Cl.
CPC ...... *G02B 27/017* (2013.01); *G02B 2027/014* (2013.01); *G02B 2027/0178* (2013.01); *G02B 2027/0187* (2013.01)
(58) Field of Classification Search
CPC .............. G02B 27/017; G02B 27/0101; G02B 27/0093; G02B 27/01; G02B 27/0172; G02B 2027/014; G02B 2027/0178; G02B 2027/0138; G02B 2027/0172; G02B 2027/0187; G02B 2027/0141; G06T 19/006; G06F 3/1454; G06F 3/013; G06F 3/012
See application file for complete search history.

(56) References Cited

U.S. PATENT DOCUMENTS

| 2015/0170422 | A1 | 6/2015 | Aoyama et al. | |
| 2016/0269631 | A1* | 9/2016 | Jiang | G09B 5/02 |
| 2016/0320622 | A1* | 11/2016 | Yoshida | G06F 3/14 |
| 2017/0010662 | A1* | 1/2017 | Nishizawa | H04B 5/0031 |
| 2019/0161942 | A1* | 5/2019 | Hokkanen | G06F 3/011 |

FOREIGN PATENT DOCUMENTS

JP 2015-115034 A 6/2015

* cited by examiner

*Primary Examiner* — Xuemei Zheng
(74) *Attorney, Agent, or Firm* — Volpe Koenig

(57) ABSTRACT

Provided is a display device to prevent a decrease in visibility of a work object. The display device includes a display unit that displays work support information through surrounding scenery, a sensor group including at least one imaging unit that images in a visual line direction of a user, a work state determination unit that determines a work state of the user based on an output from the sensor group, and a display control unit that changes display of the work support information on the display unit corresponding to the determined work state of the user.

12 Claims, 12 Drawing Sheets

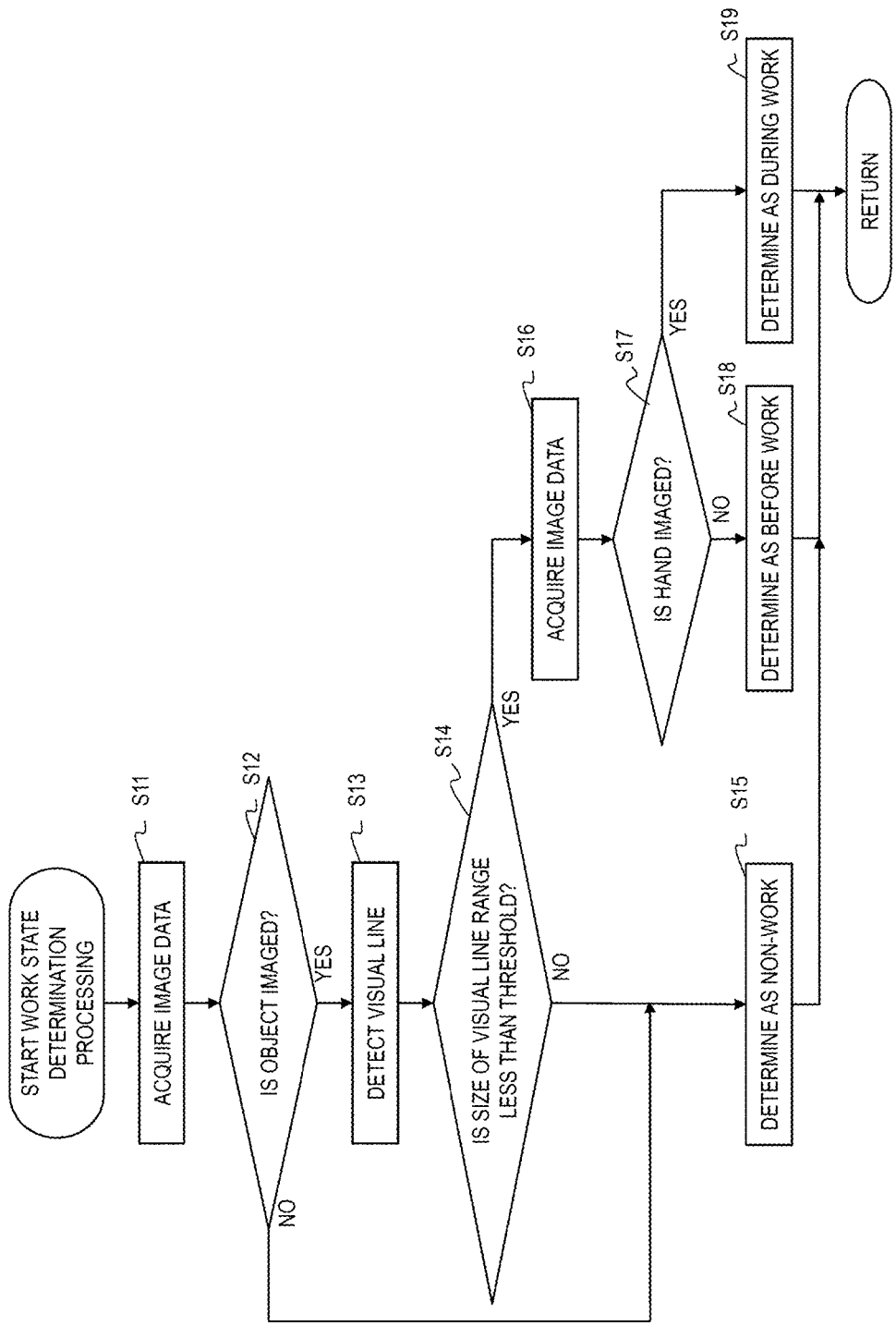

"NON-WORK"

"DURING WORK"

"NON-WORK"

"BEFORE WORK"

"DISPLAY IN SUPERIMPOSED MANNER BEFORE WORK"

"DISPLAY IN SUPERIMPOSED MANNER DURING WORK"

"DISPLAY 1 IN NON-SUPERIMPOSED MANNER DURING WORK"

"DISPLAY 2 IN NON-SUPERIMPOSED MANNER DURING WORK"

DISPLAY DEVICE, DISPLAY CONTROL METHOD, AND DISPLAY SYSTEM

BACKGROUND OF THE INVENTION

1. Field of the Invention

The present invention relates to a display device, a display control method, and a display system

2. Description of the Related Art

A see-through head mounted display (HMD), for example, a so-called smart glass, that is worn by a user on the head is used for the purpose of work support in a factory, equipment maintenance, or the like. Generally, a user wearing the see-through HMD refers to work support information (such as a work location and a work order) displayed on a see-through screen while looking at an actual work object through the screen. Accordingly, the user may perform various types of work without greatly deviating a visual line from the actual work object.

The see-through HMD may have a function of detecting a direction or a position of the visual line of the user by using a sensor such as an acceleration sensor and a gyro sensor. A display position of the work support information may be adjusted by using the function when the work support information is displayed on the see-through screen.

For example, JP-A-2015-115034 (Patent Literature 1) describes "an information display system comprising a see-through head mount display including a display/projection unit configured to display a drawing object on a virtual screen in a state superimposed on surroundings, and a detection unit configured to detect information determining a position and/or an angle of the virtual screen relative to surroundings. A controller configured to control the head mount display includes a drawing object generation unit configured to generate a drawing object on the basis of data generated by an application, refer to the information detected by the detection unit, and set a drawing position of the drawing object on the virtual screen, and a drawing processing unit configured to control the display/projection unit to draw the drawing object at the drawing position on the virtual screen. The drawing object generation unit sets a drawing priority for each drawing object according to a predetermined rule, and when the drawing positions of multiple drawing objects with different drawing priorities overlap with one another, the drawing processing unit draws the drawing objects with priority given to a drawing object with a higher drawing priority".

According to the see-through HMD disclosed in Patent Literature 1, the user can perform work while looking at a plurality of pieces of information displayed on the screen without interference. However, in practice, the information displayed on the screen is about no more than defining in advance a display position or a display content under a uniform condition. Therefore, for example, in a case where a work location or a work content is displayed in a state of superimposed on an actual object, although the display of the work location or the work content is useful when checking the work location before work, the display may be an obstacle during work and visibility of the object may be low.

In addition, the display position of information may be changed in the see-through HMD corresponding to a user interface (UI) operation from the user. However, the user cannot always perform the UI operation. For example, in a case where a voice operation is adopted as the UI operation, a recognition rate of the voice operation is low when there is loud noise in a worksite. In a case where a gesture operation, a switch operation, or the like is adopted as the UI operation, the user cannot perform the UI operation when the user holds a tool or the like.

When the user needs to perform a UI operation for each work state change, it is not convenient for the user.

SUMMARY

The invention has been made in view of such a situation and an object of the invention is to prevent a decrease in visibility of a work object.

The present application includes a plurality of methods for solving at least a part of the problems described above and an example of the methods is as follows.

In order to solve the problems described above, a display device according to an aspect of the invention includes a display unit that displays work support information through surrounding scenery, a sensor group including at least one imaging unit that images in a visual line direction of a user, a work state determination unit that determines a work state of the user based on an output from the sensor group, and a display control unit that changes display of the work support information on the display unit corresponding to the determined work state of the user.

According to an aspect of the invention, a decrease in visibility of a work object can be prevented.

Problems, configurations, and effects other than those described above will be apparent from the following description of the embodiments.

BRIEF DESCRIPTION OF THE DRAWINGS

FIG. 10 is a flowchart showing an example of operation state determination processing in detail.

FIGS. 11A to 11D show examples of image data obtained by imaging a field of view of a user, in which FIG. 11A shows an example of a non-work state, FIG. 11B shows an example of the non-work state, FIG. 11C shows an example of a state before work, and FIG. 11D shows an example of a state during work.

FIGS. 12A to 12D show display examples of work support information, in which FIG. 12A shows a display example before work, FIG. 12B shows a display example during work according to the related art, FIG. 12C shows a first display example during work, and FIG. 12D shows a second display example during work.

DETAILED DESCRIPTION OF THE PREFERRED EMBODIMENTS

Figure 1:
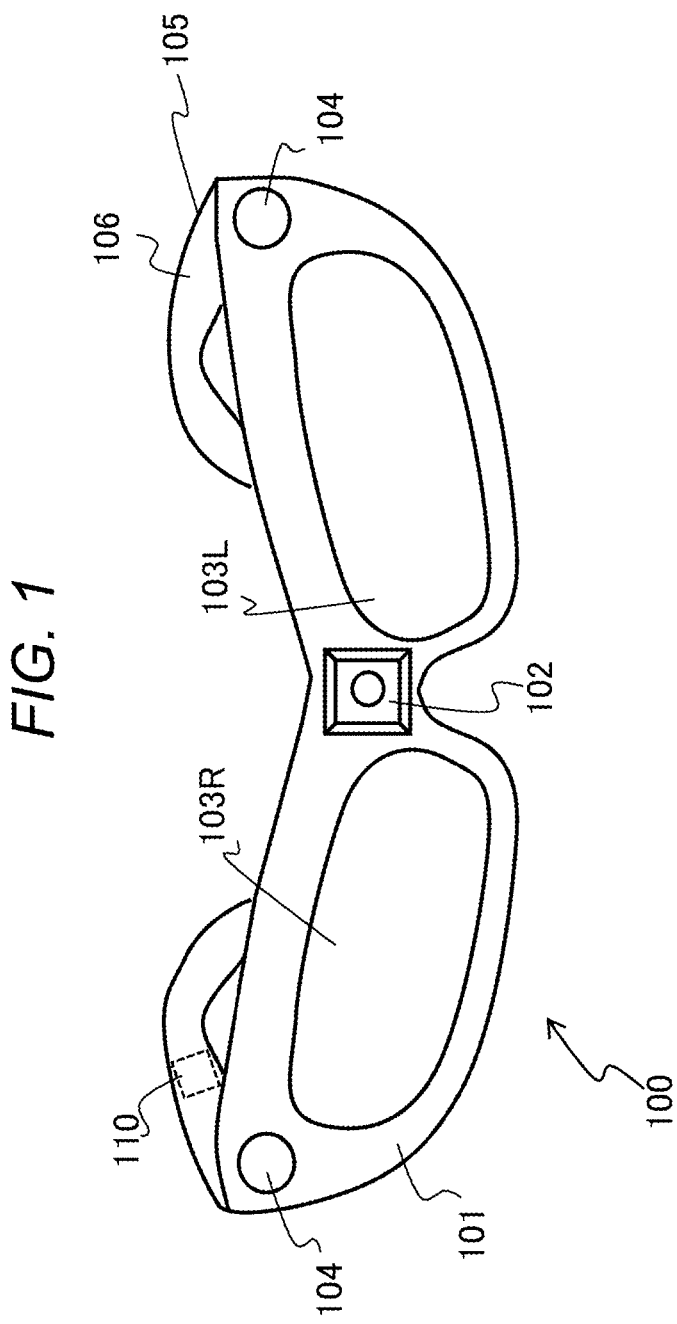
FIG. 1 is an appearance view showing an example of a display device 100 according to a first embodiment of the invention.

Embodiments of the invention will be described below with reference to the drawings. The same components are generally denoted by the same reference numerals throughout all the drawings for describing the embodiments, and the repetitive description thereof will be omitted. Further, in the embodiments described below, it is needless to say that constituent elements (including element steps) are not always indispensable unless otherwise stated or except a case where the elements are apparently indispensable in principle. Further, it is needless to say that expressions "formed of A", "made of A", "having A", and "including A" do not exclude elements other than A unless otherwise stated that A is the only element thereof. Similarly, in the following embodiments, when shapes or positional relationships of the constituent elements or the like are mentioned, substantially approximate and similar shapes and the like are included therein, unless otherwise specified or except a case where it is considered that they are apparently excluded in principle.

Figure 2:
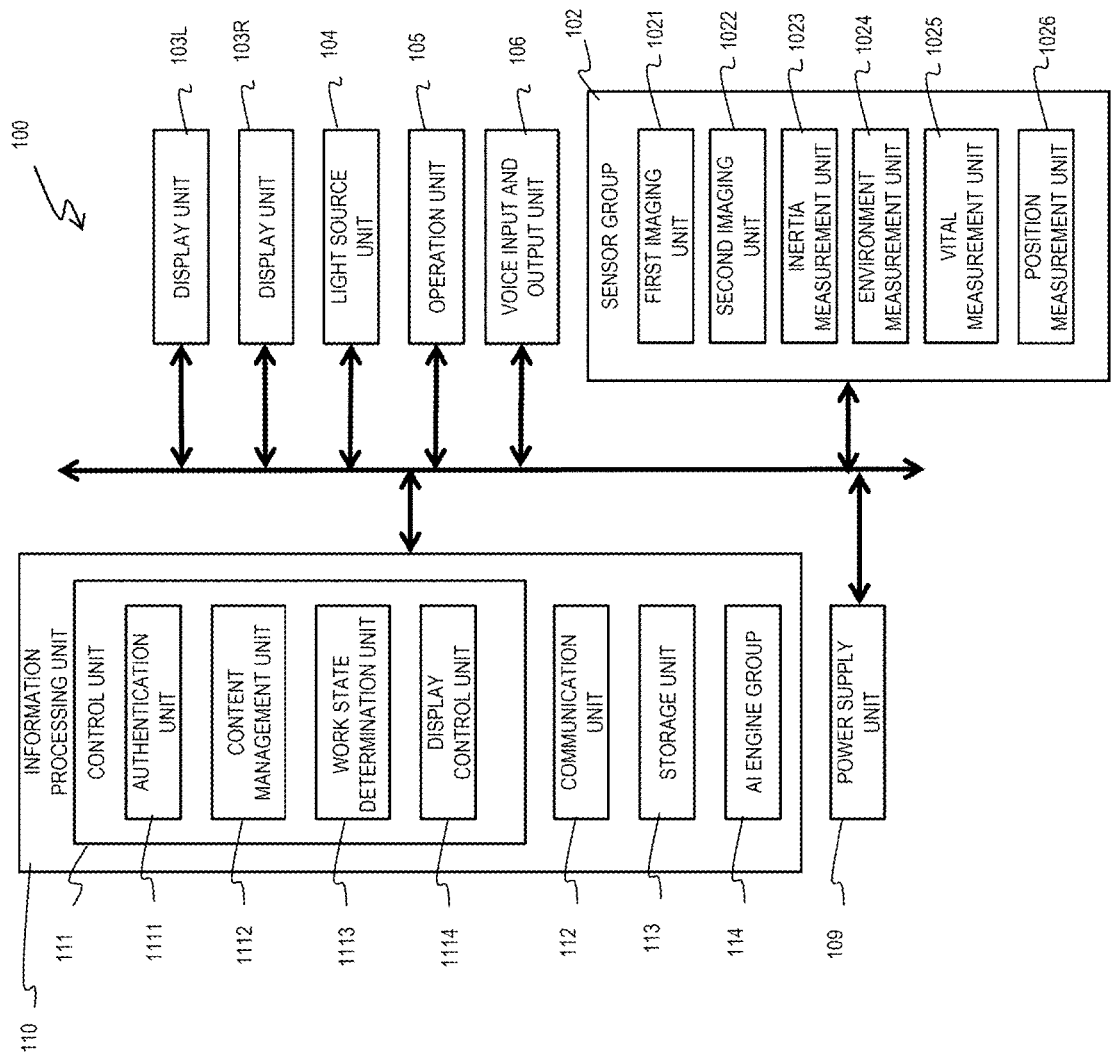
FIG. 2 is a functional block diagram showing a configuration example of the display device 100.

Configuration Example of Display Device 100 According to First Embodiment of the Invention FIG. 1 is an appearance view showing an example of the display device 100 according to the first embodiment of the invention. FIG. 2 shows a configuration example of functional blocks of the display device 100.

The display device 100 is a glasses shaped see-through HMD worn by a user on the head. However, a shape of the display device 100 is not limited to the glasses shape and may have a goggle shape or a helmet shape. The display device 100 is worn when the user performs work such as work in a factory and device maintenance work and displays information used for work support.

The display device 100 includes a sensor group 102, display units 103L and 103R, light source units 104, an operation unit 105, a voice input and output unit 106, a power supply unit 109, and an information processing unit 110 on a surface of a glasses shaped frame 101 or inside the glasses shaped frame 101.

The sensor group 102 is provided, for example, at the center of a front surface of the glasses shaped frame 101. As shown in FIG. 2, the sensor group 102 includes various sensors such as a first imaging unit 1021, a second imaging unit 1022, an inertia measurement unit 1023, an environment measurement unit 1024, a vital measurement unit 1025, and a position measurement unit 1026. The sensor group 102 outputs a sensing result to the information processing unit 110. The sensor group 102 is not limited to being provided at the center of the glasses shaped frame 101 and may be provided at another position.

The first imaging unit 1021 includes a camera or the like and images a static image or a moving image taking a field of view of the user as an imaging object. The second imaging unit 1022 includes an omnidirectional camera or the like and images a static image or a moving image taking a surrounding environment including the user as an imaging object. The static image or the moving image imaged by the second imaging unit 1022 is used to detect a visual line of the user. The first imaging unit 1021 and the second imaging unit 1022 correspond to an imaging unit of the invention.

The inertia measurement unit 1023 includes a sensor such as an acceleration sensor and a gyro sensor and detects a movement of the head of the user. Such movement information is used to estimate a visual line direction or a visual line position of the user.

The environment measurement unit 1024 includes a sensor such as an illuminometer, a thermometer, a hygrometer, and a microphone and acquires information relating to the surrounding environment of the user.

The vital measurement unit 1025 includes a sensor such as a heart rate meter, a clinical thermometer, a sphygmomanometer, a pulse rate meter, and an electroencephalograph and acquires body information on the user. The body information is used to estimate a physical condition or a feeling of the user.

The position measurement unit 1026 includes a sensor such as a geomagnetic sensor and a global positioning system (GPS) sensor and acquires a current position of the user.

The display units 103L and 103R are respectively provided in front of the left eye and the right eye of the user and display work support information through surrounding scenery of the user. Therefore, the user can check the work support information displayed on the display units 103L and 103R while recognizing the surrounding scenery through the display units 103L and 103R. Alternatively, only one of the display units 103L and 103R may be provided and the other one may be omitted.

The light source units 104 are provided, for example, at a left end and a right end of the front surface of the glasses shaped frame 101 and emit illumination light to the field of view of the user. The illumination light can be emitted in a wide range by providing the light source units 104 at the left end and the right end of the front surface of the glasses shaped frame 101. Alternatively, the number or arrangement of the light source units 104 is not limited to the example shown in the drawing and may be changed to any number or provided at any position.

The operation unit 105 is provided, for example, on a temple of the glasses shaped frame 101. The operation unit 105 includes a switch, a dial, and the like and receives operations from the user such as power ON/OFF, display luminance adjustment, and output volume adjustment.

The voice input and output unit 106 is provided, for example, on the temple of the glasses shaped frame 101. The voice input and output unit 106 includes a microphone, a speaker, and the like. The voice input and output unit 106 acquires, for example, a spoken voice of the user and outputs a predetermined voice. The spoken voice of the user acquired by the voice input and output unit 106 may be recognized as a voice used for a voice operation.

The power supply unit 109 includes a power supply interface connected to a battery or an external AC adapter. The power supply unit 109 supplies power to each unit of the display device 100.

As shown in FIG. 2, the information processing unit 110 includes a control unit 111, a communication unit 112, a storage unit 113, and an AI engine group 114.

The control unit 111 is implemented by, for example, a central processing unit (CPU) executing a predetermined program. The control unit 111 controls the entire display device 100. The control unit 111 includes functional blocks such as an authentication unit 1111, a content management unit 1112, a work state determination unit 1113, and a display control unit 1114.

The authentication unit 1111 performs personnel authentication processing, device authentication processing, service authentication processing, and the like when the display device 100 is connected to another device. The content management unit 1112 manages a content used for displaying work support information that is performed at the time of work support.

Based on the sensing result of the sensor group 102, the work state determination unit 1113 determines a work state of the user using the AI engine group 114. The display control unit 1114 generates work support information based on the content used for displaying work support information. The display control unit 1114 controls the display units 103L and 103R to display the generated work support information. The work support information includes at least one of a work location 511 and a work content 512 (anyone in FIG. 12).

The communication unit 112 includes a communication module corresponding to at least one communication mode of Ethernet, Wi-Fi, blue-tooth, low-power wide area (LPWA), universal serial bus (USB) (of any registered trademark), and the like and connects another device in a wired or wireless manner to communicate predetermined information.

The storage unit 113 includes a storage such as a semiconductor memory. The storage unit 113 stores various programs, authentication information, contents, and the like. The AI engine group 114 estimates and determines various events using a parameter or a threshold of a result obtained by machine learning or deep learning. The AI engine group 114 may be implemented by hardware or by a CPU executing a predetermined program. The AI engine group 114 may be implemented as a functional block of the control unit 111.

Figure 3:
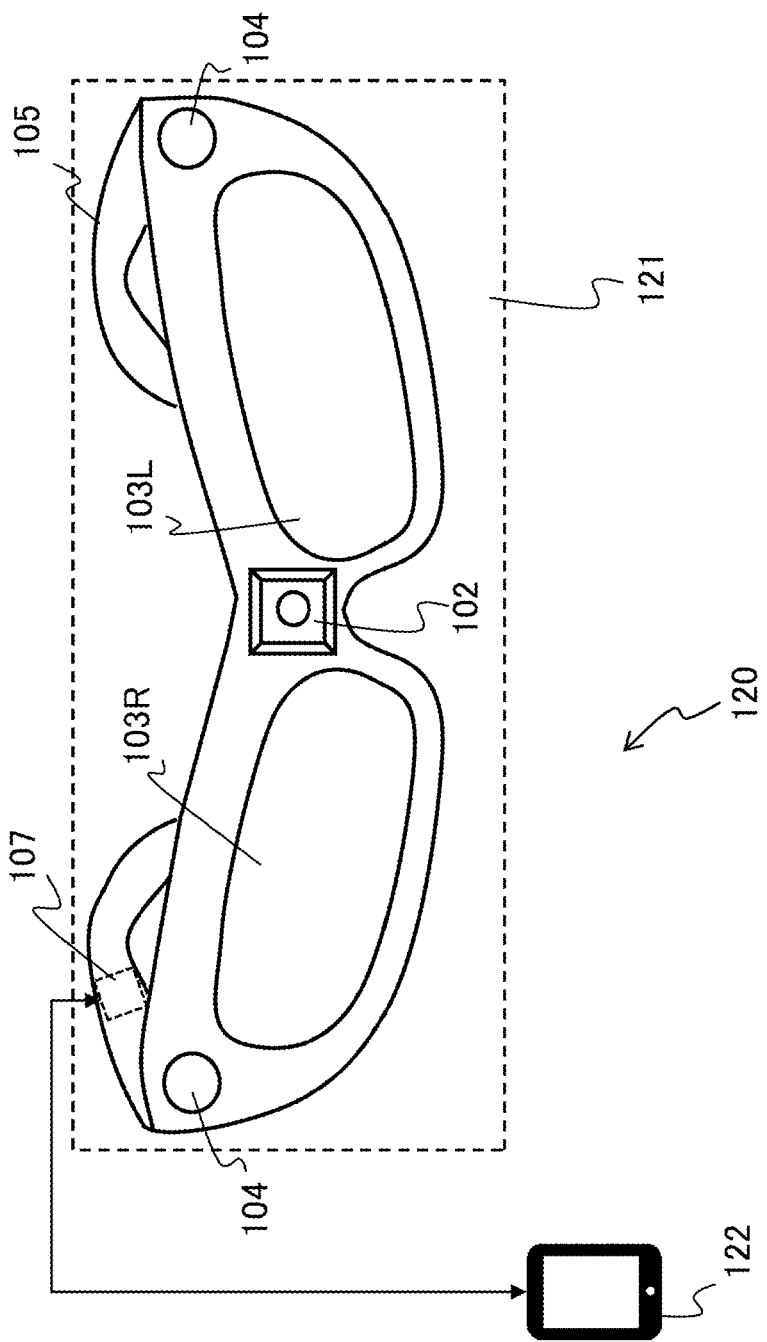
FIG. 3 is a diagram showing a configuration example of a display system 120 according to a second embodiment of the invention.

Configuration Example of Display System 120
According to Second Embodiment of the Invention Next, FIG. 3 shows a configuration example of the display system 120 according to the second embodiment of the invention.

The display system 120 includes a display device 121 and the information processing device 122. The display device 121 is implemented by omitting the information processing unit 110 of the display device 100 shown in FIG. 1 and adding a communication unit 107. The display device 121 is connected to the information processing device 122 in a wired or wireless manner using the communication unit 107 and communicates predetermined information. A communication mode of the communication unit 107 may be any communication mode such as Ethernet, Wi-Fi, blue-tooth, LPWA, and USB.

Figure 4:
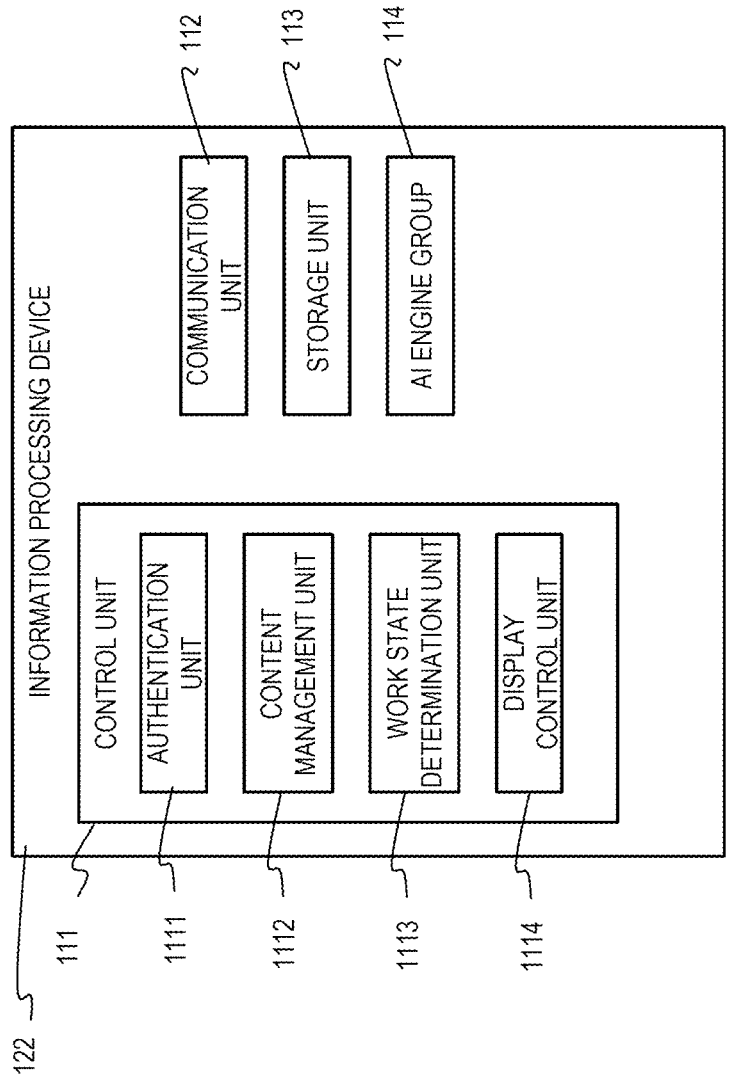
FIG. 4 is a functional block diagram showing a configuration example of an information processing device 122 that is provided in the display system 120.

Next, FIG. 4 shows a configuration example of functional blocks of the information processing device 122 of the display system 120.

The information processing device 122 includes a general computer such as a smartphone or a tablet computer. The information processing device 122 has the same function as the information processing unit 110 of the display device 100 shown in FIG. 1. As shown in FIG. 4, the information processing device 122 includes the same functional blocks with the information processing unit 110 shown in FIG. 2. The functional blocks of the information processing device 122 are denoted by the same reference numerals with corresponding functional blocks of the information processing unit 110, and description thereof is omitted.

According to the display system 120, the display device 121 and the information processing device 122 are separated. Accordingly, a size and weight of the display device 121 can be reduced compared to the display device 100 and a wearing feeling of a user can be improved. For example, when the display device 121 and the display device 100 are provided with batteries having the same capacity, the communication unit 107 consumes less power than the information processing unit 110 of the display device 100. Accordingly, driving time of the display device 121 can be extended compared to that of the display device 100.

Figure 5:
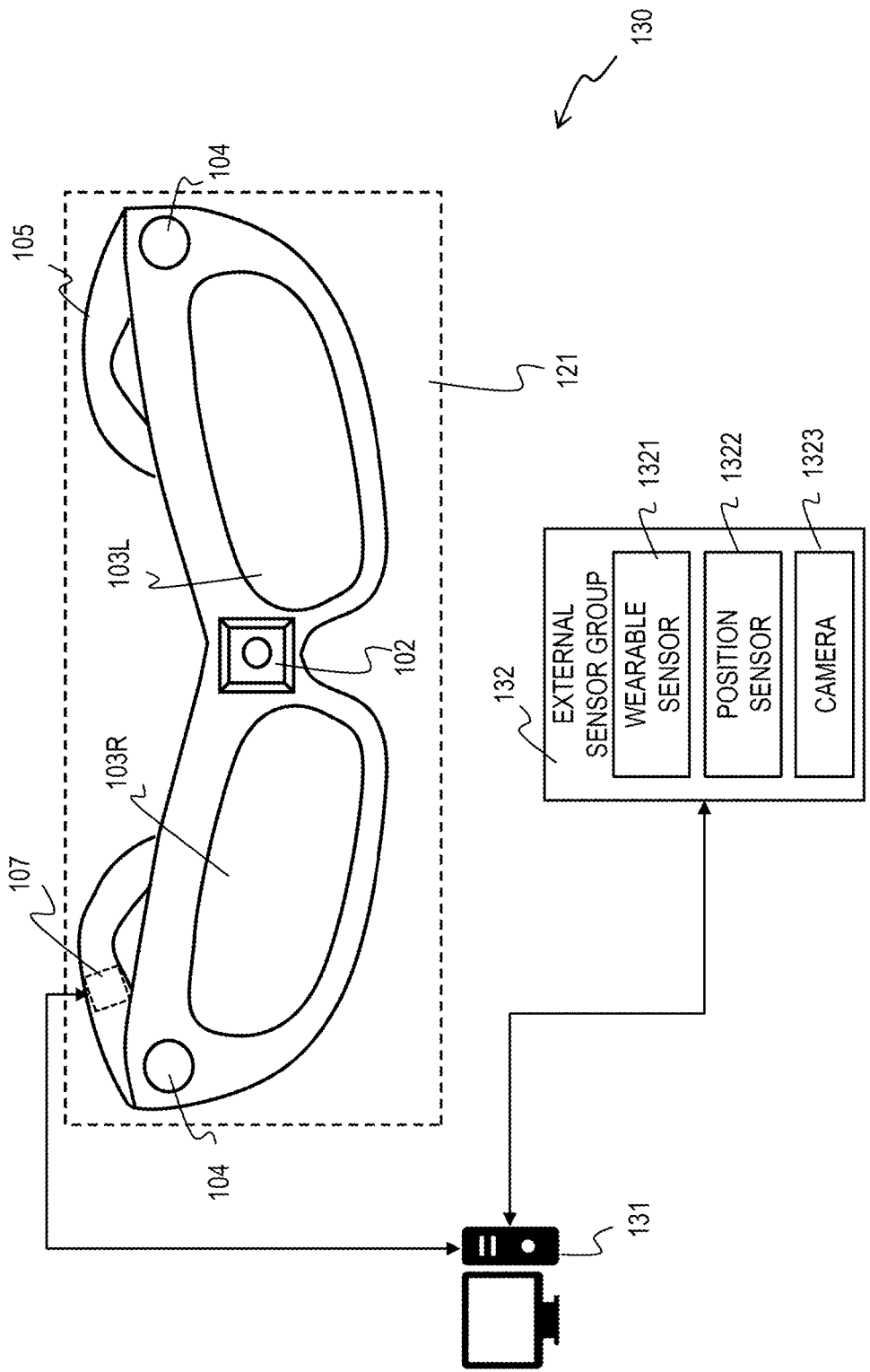
FIG. 5 is a diagram showing a configuration example of a display system 130 according to a third embodiment of the invention.

Configuration Example of Display System 130
According to Third Embodiment of the Invention Next, FIG. 5 shows a configuration example of the display system 130 according to the third embodiment of the invention.

The display system 130 includes the display device 121, an information processing device 131, and an external sensor group 132. The display device 121 is the same as the display device 121 of the display system 120 shown in FIG. 3. The display device 121 of the display system 130 is connected to the information processing device 131 and the external sensor group 132 in a wired or wireless manner using the communication unit 107 and communicates predetermined information.

The information processing device 131 has the same function as the information processing unit 110 of the display device 100 shown in FIG. 2. In addition, the information processing device 131 has a function of managing the external sensor group 132.

As shown in FIG. 5, the external sensor group 132 includes a wearable sensor 1321, a position sensor 1322, a camera 1323, and the like, and outputs a sensing result to the information processing device 131. The wearable sensor 1321 is worn by a user and detects a movement and vital information (such as a heart rate, body temperature, blood pressure, a pulse rate, and a brain wave) of the user. The position sensor 1322 detects position information of the display system 130. The camera 1323 images surroundings of the display system 130. The sensing result from the external sensor group 132 is used to estimate a physical condition, a feeling, a visual line, a posture, a position, and the like of the user. The sensing result from the external sensor group 132 may be output to the information processing device 131 via the display device 121.

Figure 6:
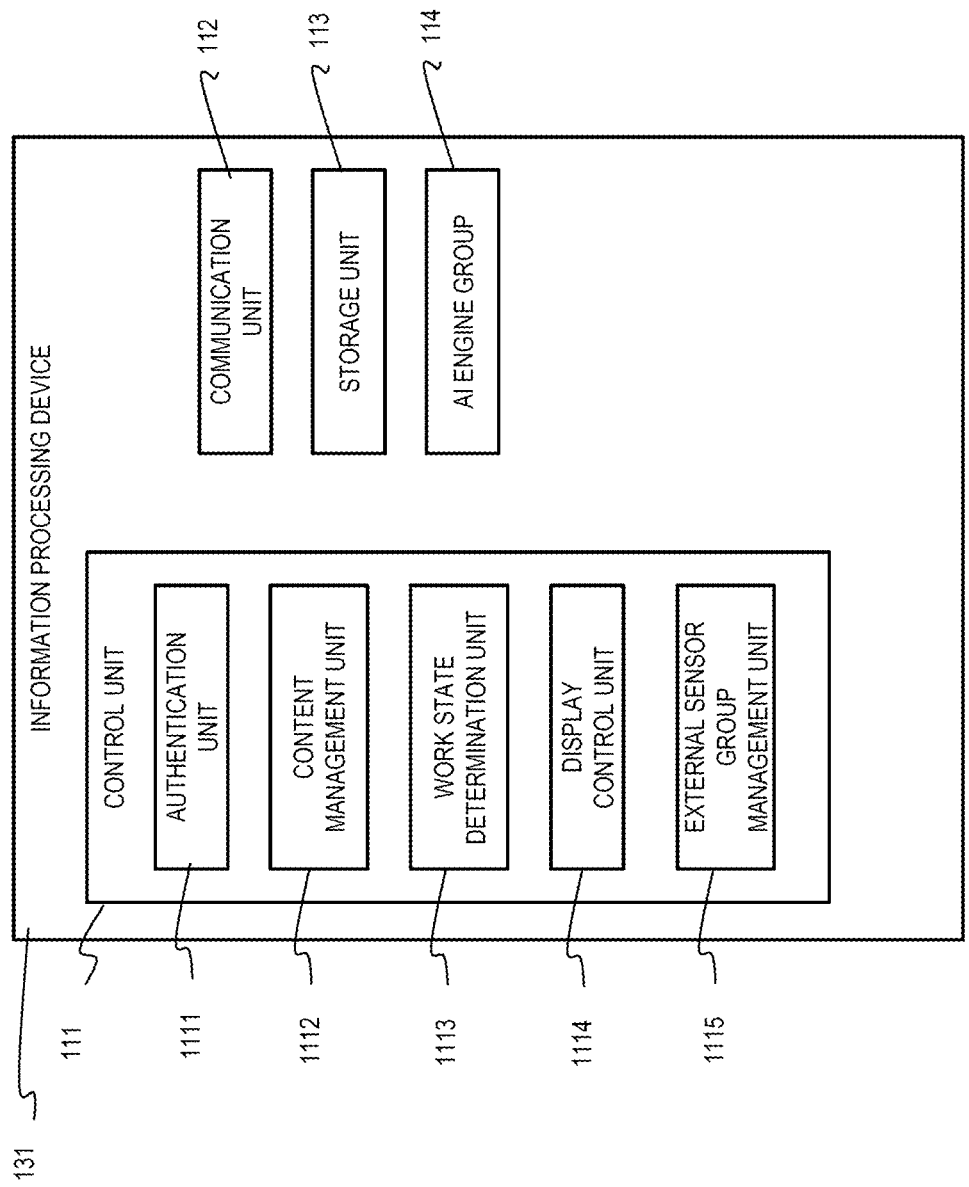
FIG. 6 is a functional block diagram showing a configuration example of an information processing device 131 that is provided in the display system 130.

Next, FIG. 6 shows a configuration example of functional blocks of the information processing device 131 of the display system 130.

The information processing device 131 includes a general computer such as a personal computer. As described above, the information processing device 131 has the same function as the information processing unit 110 of the display device 100. As shown in FIG. 6, the information processing device 131 includes an external sensor group management unit 1115 in addition to the same functional blocks with the information processing section 110 shown in FIG. 2. The functional blocks of the information processing device 131 are denoted by the same reference numerals as corresponding functional blocks of the information processing unit 110, and description thereof is omitted. The external sensor group management unit 1115 is connected with the external sensor group 132, controls the external sensor group 132, and acquires a sensing result.

According to the display system 130, the same effect as the display system 120 can be obtained. In addition, the sensing result from the external sensor group 132 is used in the display system 130. Accordingly, the visual line or a work state of the user can be accurately determined and display used for work support can be appropriately displayed.

When a processing capability of the information processing device 131 is higher than a processing capability of the information processing device 122 shown in FIG. 4, a plurality of display devices 121 may be simultaneously connected to the information processing device 131, and different pieces of information corresponding to work states of users may be displayed on each of the display devices 121.

Figure 7:
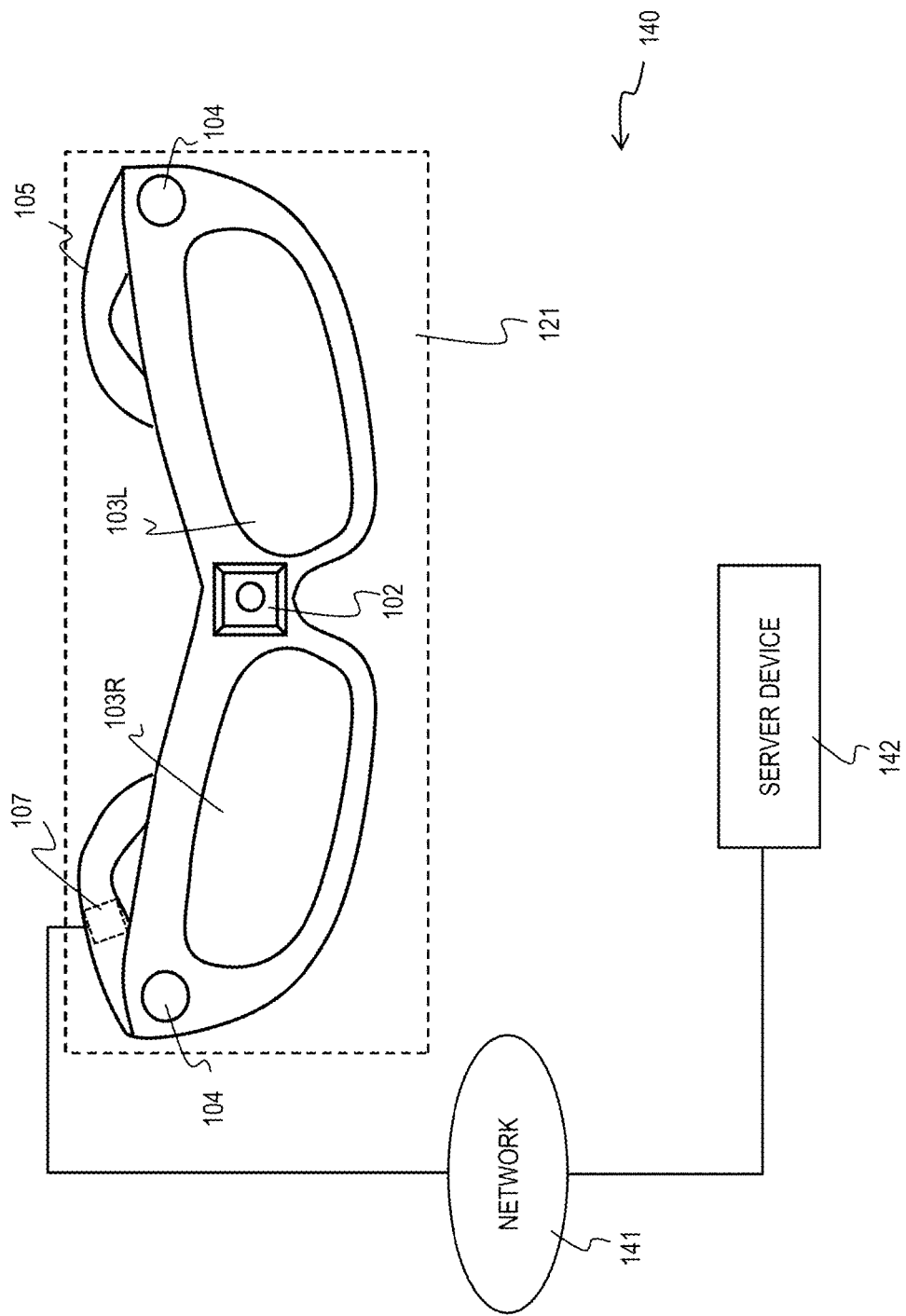
FIG. 7 is a diagram showing a configuration example of a display system 140 according to a fourth embodiment of the invention.

Configuration Example of Display System 140
According to Fourth Embodiment of the Invention Next, FIG. 7 shows a configuration example of the display system 140 according to the fourth embodiment of the invention.

The display system 140 includes the display device 121, the information processing device 131, and a server device 142. The display device 121 of the display system 140 is the same as the display device 121 of the display system 120 shown in FIG. 3. The display device 121 of the display system 140 is connected to a network 141 in a wired or wireless manner using the communication unit 107 and communicates predetermined information with the server device 142 on the network 141.

The network 141 is a bidirectional communication network such as a local area network (LAN), a wide area network (WAN), a mobile phone communication network, and the Internet.

The server device 142 has the same function as the information processing unit 110 of the display device 100 shown in FIG. 2.

Figure 8:
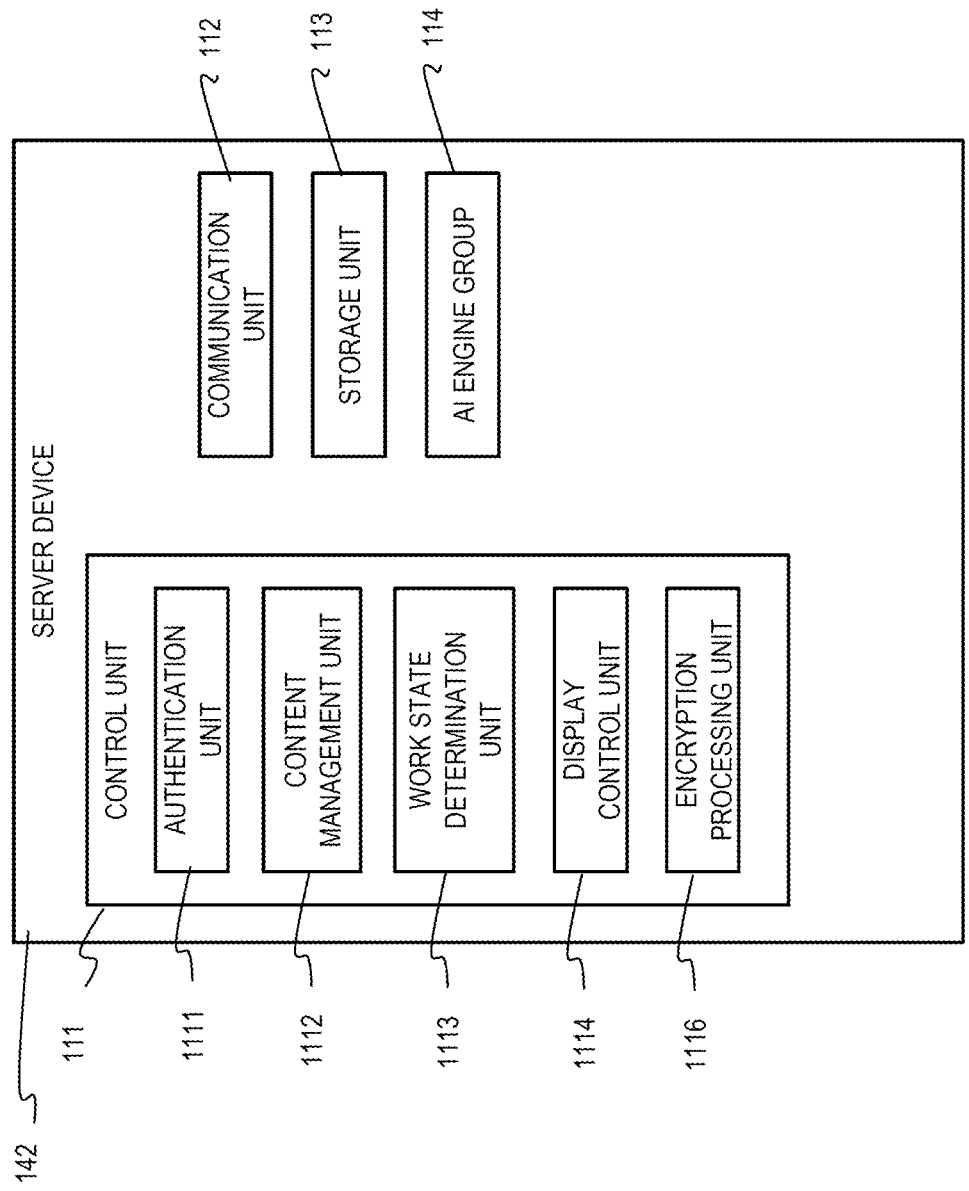
FIG. 8 is a functional block diagram showing a configuration example of a server device 142 that is provided in the display system 140.

Next, FIG. 8 shows a configuration example of functional blocks of the server device 142 of the display system 140.

The server device 142 is a general computer such as a server computer. As described above, the server device 142 has the same function as the information processing unit 110 of the display device 100. As shown in FIG. 8, the server device 42 includes an encryption processing unit 1116 in addition to the same functional blocks as the information processing unit 110 shown in FIG. 2. The functional blocks of the information processing device 131 are denoted by the same reference numerals as corresponding functional blocks of the information processing unit 110, and description thereof is omitted. The encryption processing unit 1116 performs encryption and decryption on information that is communicated with the display device 121 via the network 141.

According to the display system 140, the same effect as the display system 120 can be obtained. Since the display system 140 can encrypt communication between the display device 121 and the server device 142, disclosure of a communication content between the display device 121 and the server device 142 can be prevented. Therefore, information that should be kept confidential from others can be displayed on the display device 121.

A plurality of display devices 121 may be simultaneously connected to the server device 142, and different pieces of work support information corresponding to work states of users may be displayed on each of the display devices 121.

Functions of the devices in the display device 100 and the display systems 120, 130, and 140 are not limited to examples shown in the drawings and may be changed as appropriate.

Display Processing

Next, display processing performed by the display device 100 shown in FIG. 1, the display system 120 shown in FIG. 3, the display system 130 shown in FIG. 5, and the display system 140 shown in FIG. 7 will be described with reference to FIGS. 9 to 12.

Figure 9:
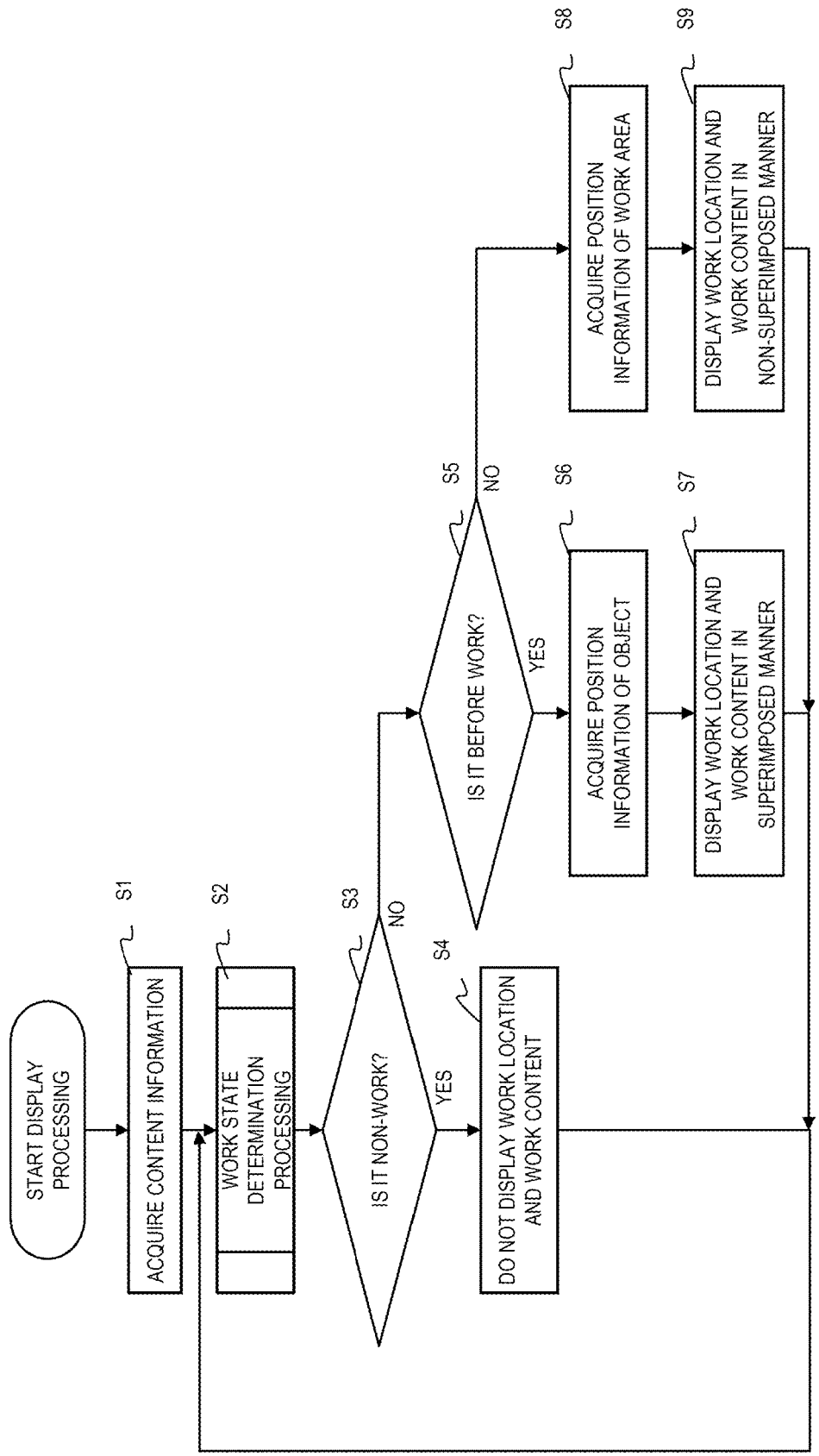
FIG. 9 is a flowchart showing an example of display processing.
Figure 11B:
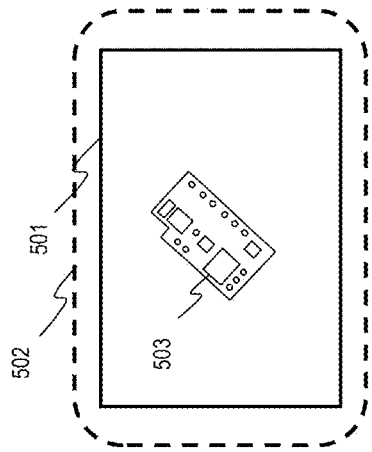
Figure 11D:
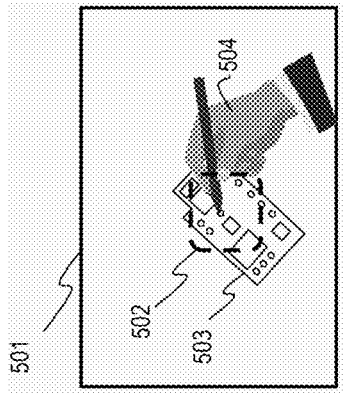
Figure 11A:
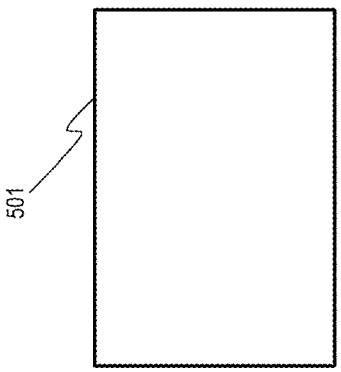
Figure 11C:
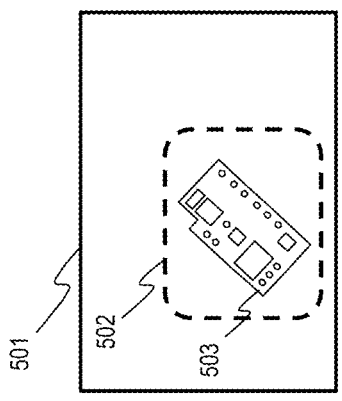
Figure 12A:
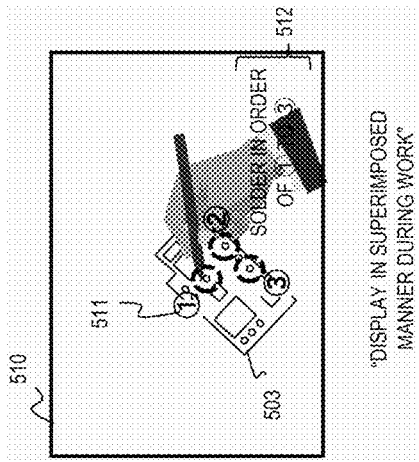
Figure 12B:
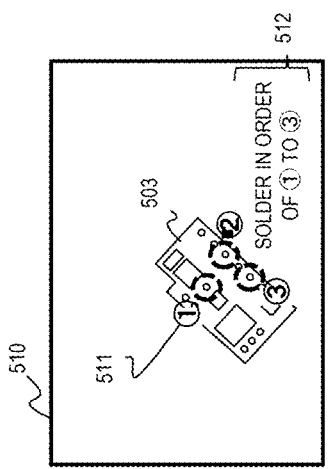
Figure 12C:
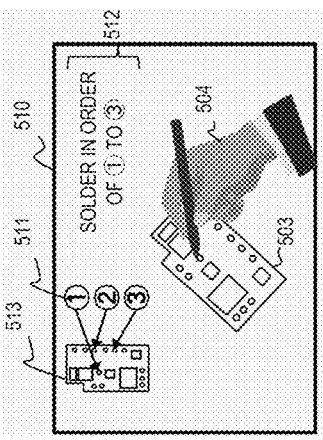
Figure 12D:
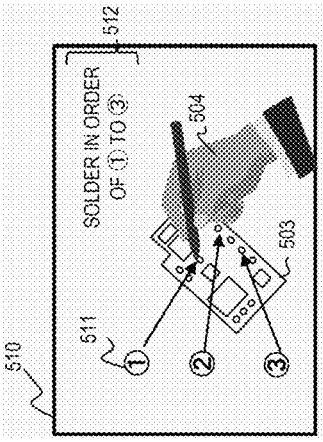

FIG. 9 is a flowchart showing an example of the display processing. FIG. 10 is a flowchart showing in detail an example of operation state determination processing in step S2 in the display processing. FIGS. 11A to 11D show examples of image data obtained by imaging a field of view of a user. FIG. 11A shows an example of image data in a "non-work" state. FIG. 11B shows an example of image data in the "non-work" state. FIG. 11C shows an example of image data in a state "before work". FIG. 11D shows an example of image data in a state "during work". FIGS. 12A to 12D show display examples of work support information. FIG. 12A shows a display example "before work". FIG. 12B shows a display example "during work" according to the related art. FIG. 12C shows a first display example "during work". FIG. 12D shows a second display example "during work".

The display processing is, for example, processing used for supporting work of soldering an electronic component on an electronic substrate that is a work object. Specifically, work of the user is supported by displaying work support information including the work location 511 shown in FIG. 12 that represents a soldering position and order and the work content 512 shown in FIG. 12 at positions superimposing the electronic substrate that is seen by the user via the display units 103L and 103R.

The display processing is performed, for example, corresponding to a predetermined start operation performed by the user on the operation unit 105.

First, the content management unit 1112 acquires from the storage unit 113 a content corresponding to work to be performed. Then, the display control unit 1114 generates work support information used for supporting the work of the user based on the acquired content (step S1). Thereafter, the work state determination unit 1113 performs work state determination processing to determine a current work state of the user (step S2).

The work state determination processing in step S2 will be described with reference to FIG. 10. First, the work state determination unit 1113 acquires image data 501 obtained by imaging in a visual field direction of the user by the first imaging unit 1021 (step S11).

Next, the work state determination unit 1113 performs image recognition processing on the image data 501 acquired in step S11 using the AI engine group 114, and determines whether a work object 503 (the electronic substrate in this case) is imaged in the image data 501 (step S12). For example, as shown in FIG. 11A, the work state determination unit 1113 determines that the work state is a "non-work" state (step S15) when the work state determination unit 1113 determines that the work object 503 is not imaged in the image data 501 (NO in step S12).

On the contrary, when the work state determination unit 1113 determines that the work object 503 is imaged in the image data 501 (YES in step S12), the work state determination unit 1113 acquires image data imaged by the second imaging unit 1022 for a predetermined time (for example, for several seconds), performs the image recognition processing using the AI engine group 114, and detects a movement range 502 of the visual line of the user (step S13). Thereafter, the work state determination unit 1113 determines whether a size of the movement range 502 of the visual line of the user is less than a predetermined threshold (step S14). For example, as shown in FIG. 11B, the work state determination unit 1113 determines that the work state is the "non-work" state (step S15) when the work state determination unit 1113 determines that the size of the movement range 502 of the visual line of the user is not less than the predetermined threshold, that is, when the visual line of the user moves greatly and does not focus on the work object 503 (NO in step S14).

On the contrary, when the work state determination unit 1113 determines that the size of the movement range 502 of the visual line of the user is less than the predetermined threshold, that is, when the user focuses on the work object 503 (YES in step S14), the work state determination unit 1113 again acquires the image data 501 obtained by imaging in the visual field direction of the user by the first imaging unit 1021 (step S16).

Next, the work state determination unit 1113 performs the image recognition processing on the image data 501 acquired in step S16 using the AI engine group 114, and determines whether a hand 504 of the user is imaged in the image data 501 (step S17). For example, as shown in FIG. 11C, the work state determination unit 1113 determines that the work state is a state "before work" (step S18) when the work state determination unit 1113 determines that the hand 504 of the user is not imaged in the image data 501 (NO in step S17).

On the other hand, as shown in FIG. 11D, the work state determination unit 1113 determines that the work state is a state "during work" (step S19), for example, when the work state determination unit 1113 determines that the hand 504 of the user is imaged in the image data 501 (YES in step S17).

After the work state of the user is determined as described above, the processing proceeds to step S3 in FIG. 9.

In the above-described work state determination processing, the visual line of the user and the presence or absence of the work object and the hand of the user are detected based on the image data imaged by the first imaging unit 1021 and the second imaging unit 1022, and the work state is determined based on the detection. Alternatively, other sensor outputs may be used.

For example, an output of the inertia measurement unit 1023 may be used to detect whether the head of the user moves or whether the user walks so as to determine the work state as the "non-work" state when a movement quantity of the head of the user instead of the visual line data is equal to or larger than a threshold or when the user walks. For example, the position measurement unit 1026 may acquire position information of the user and the work state may be determined as a state "during work" when the user is at a predetermined correct work location. For example, a sensor may acquire a state in which the user wears the display device 100 or the like and the work state may be determined as a "non-work" state when the display device 100 or the like is not worn at a correct position (the display device 100 or the like is out of the field of view). In addition, outputs of a plurality of sensors may be used to acquire a state of the user and surrounding environment information.

In the above-described work state determination processing, the work state of the user is determined as any one of three types including "before work", "during work", and "non-work". Alternatively, "after work" may be added as a fourth type and the work state of the user may be determined as any one of the four types. In this case, for example, the image recognition processing is performed on the image data 501 using the AI engine group 114 so that the work state may be determined as a state "after work" when the hand of the user disappears from the image data 501 after the state "during work".

The processing now returns to FIG. 9. Next, the display control unit 1114 confirms whether a determination result in step S2 is "non-work" (step S3). When the display control unit 1114 confirms that the determination result is "non-work" (YES in step S3), the display control unit 1114 does not display the work support information (the work location 511 and the work content 512) (step S4). In this case, the user sees the surrounding scenery via the display units 103L and 103R of the display device 100 or the like. Thereafter, the processing returns to step S2 and subsequent steps are repeated.

On the contrary, when the display control unit 1114 confirms that the determination result is not "non-work", that is, when the display control unit 1114 confirms that the determination result is "before work" or "during work" (NO in step S3), the display control unit 1114 confirms whether the determination result in step S2 is "before work" (step S5). When the display control unit 1114 confirms that the determination result is "before work" (Yes in step S5), the display control unit 1114 acquires a position of the work object 503 in the image data 501 (step S6). Then, the display control unit 1114 displays the work support information on the display units 103L and 103R such that the work location 511 that is the work support information can be seen superimposed on the work object 503, for example, as shown in FIG. 12A (displays the work support information in a superimposed manner) (step S7). Thereafter, the processing returns to step S2 and subsequent steps are repeated.

When the display control unit 1114 confirms that the determination result is not "before work", that is, when the display control unit 1114 confirms that the determination result is "during work" (NO in step S5), the display control unit 1114 acquires a position of a work area having a predetermined size and including the work object 503 and the hand 504 of the user in the image data 501 (step S8). The size of the work area may be common to all users, or may be set in advance on a user basis. Then, the display control unit 1114 displays the work support information on the display units 103L and 103R such that the work support information is not superimposed on the work area, for example, as shown in FIG. 12C (displays the work support information in a non-superimposed manner) (step S9). However, an arrow or a line used for indicating a work location may be displayed on the work object 503 in a superimposed manner to improve workability. Thereafter, the processing returns to step S2 and subsequent steps are repeated.

Instead of a display example of "during work" as shown in FIG. 12C, a work object image 513, the work location 511, and the work content 512 may be displayed at positions that are not superimposed on the work area as shown in FIG. 12D.

According to the display processing described above, the work of the user can be supported without lowering workability of the user or hindering visibility of the user compared with a display example of "during work" in the related art as shown in FIG. 12B in which the work location 511 is displayed in a superimposed manner on the work object 503 and the work content 512 is displayed in a superimposed manner on the hand 504 of the user.

Modification

In the display processing described above, the work support information is displayed in a superimposed manner "before work" and in a non-superimposed manner "during work". Alternatively, the work support information may not be displayed "during work" depending on a skill level of the user. Therefore, the work support information may be displayed in a superimposed manner "before work" and may not be displayed "during work" in a modification of the display processing. Alternatively, the work support information may be displayed in a non-superimposed manner "before work" and in a superimposed manner "during work".

In addition, when "after work" is added as a work state, the work support information may be displayed in a non-superimposed manner "during work" in order to ensure visibility and may be displayed in a superimposed manner "after work" so that it can be easy to recognize a work state of the user.

The skill level of the user may be registered in advance as user information, or may be determined by the AI engine group 114 analyzing image data obtained by imaging a work state. In this case, the AI engine group 114 corresponds to a skill level determination unit of the invention. In addition to the skill level of the user, the user information may include the size of the work area and work support information dedicated to the user (for example, information such as shifting the work location 511 by a predetermined distance from an actual work location).

A character or diagram of the work support information may be enlarged and description may be shown in detail "before work". The character or diagram of the work support information may be reduced and the description may be simplified to ensure visibility of the work object 503 "during work".

Whether the work support information is displayed in a superimposed manner or a non-superimposed manner may be determined corresponding to a resolution of image data acquired by the first imaging unit 1021.

The present embodiment describes an example in which the user can wear the display device 100 or the like. Alternatively, the invention may be applied to, for example, a head up display (HUD) that is attached to a construction vehicle or the like. In this case, a work state may be determined from a sensor that is attached to the construction vehicle or worn by an operator who operates the construction vehicle, and a display position or a display content on the HUD may be optimized.

The invention is not limited to the above-described embodiments and modification, and includes various modifications. For example, the embodiments described above have been described in detail for easy understanding of the invention, and the invention is not necessarily limited to those including all the components described above. Further, a part of the configuration of one embodiment can be replaced with the configuration of another embodiment, and the configuration of another embodiment can be added to the configuration of one embodiment. A part of the configuration of each embodiment can be added, deleted, or replaced with another configuration.

The invention may be provided in various forms such as a display device, a display control method, a display system, and a computer readable program.

What is claimed is:

1. A display device comprising:
    a display unit that displays work support information through surrounding scenery;
    a sensor group including at least one imaging unit that images in a visual line direction of a user; and
    a processor communicatively coupled to the sensor group and the display unit, wherein the processor is configured to
        determine a work state of the user based on an output from the sensor group,
        determine if the output includes a work object,
        acquire over a predetermined period of time, a plurality of additional outputs from the sensor group, the plurality of different outputs being captured by the sensor group,
        perform image recognition processing on ones of the plurality of additional outputs,
        detect, from the image recognition processing performed, a movement range of a visual line of the user,
        determine if the movement range is less than or equal to a predetermined threshold,
            on a condition that the movement range is less than or equal to the predetermined threshold, determine that the work state is a first state,
            on a condition that the movement range is greater than the predetermined threshold, determine that the work state is a second state, and
        change display of the work support information on the display unit corresponding to the determined work state of the user.

2. The display device according to claim 1, wherein
the processor displays the work support information in a superimposed manner or a non-superimposed manner on the work object through the display unit corresponding to the determined work state of the user.

3. The display device according to claim 2, wherein
the processor displays the work support information in a superimposed manner or a non-superimposed manner on the work area including the work object and a hand of the user through the display unit corresponding to the determined work state of the user.

4. The display device according to claim 3, wherein
the processor determines whether the work state of the user is "non-work", "before work" or "during work" based on the output from the sensor group,
the processor displays the work support information in a superimposed manner on the work object through the display unit when the work state of the user is determined as the "before work", and
the processor displays the work support information in a non-superimposed manner on the work area when the work state of the user is determined as the "during work".

5. The display device according to claim 3, wherein the processor
    determines whether the work state of the user is "non-work", "before work" or "during work" based on the output from the sensor group,
    displays the work support information in a non-superimposed manner on the work object through the display unit when the work state of the user is determined as the "before work", and
    displays the work support information in a superimposed manner on the work area when the work state of the user is determined as the "during work".

6. The display device according to claim 1, wherein
the processor displays, via the display, at least one of a work location and a work content that serve as the work support information in a superimposed manner or a non-superimposed manner corresponding to the determined work state of the user.

7. The display device according to claim 1, wherein the processor displays or does not displays the work support information on the display unit corresponding to the determined work state of the user.

8. The display device according to claim 1, wherein the processor changes display of the work support information on the display unit based on the determined work state of the user and user information.

9. The display device according to claim 8, wherein the processor changes the display of the work support information on the display unit based on the determined work state of the user and a skill level that serves as the user information.

10. The display device according to claim 9, wherein the processor is further configured to determines the skill level of the user.

11. A display control method performed by a display device, the display control method comprising:
   determining a work state of a user based on an output from a sensor group that includes at least one imaging unit that images in a visual line direction of the user;
   determining if the output includes a work object,
   acquiring, over a predetermined period of time, a plurality of additional outputs from the sensor group, the plurality of different outputs being captured by the sensor group,
   performing image recognition processing on ones of the plurality of additional outputs,
   detecting, from the image recognition processing performed, a movement range of a visual line of the user,
   determining if the movement range is less than or equal to a predetermined threshold,
      on a condition that the movement range is less than or equal to the predetermined threshold, determining that the work state is a first state,
      on a condition that the movement range is greater than the predetermined threshold, determining that the work state is a second state, and
   changing display of work support information on a display unit that displays the work support information through surrounding scenery corresponding to the determined work state of the user.

12. A display system comprising:
   a display device that displays work support information through surrounding scenery;
   a sensor group including at least one imaging unit that images in a visual line direction of a user; and
   an information processing device that controls display on the display device based on an output from the sensor group, wherein the information processing device is configured to
   determine a work state of the user based on the output from the sensor group,
   determine if the output includes a work object,
   acquire over a predetermined period of time, a plurality of additional outputs from the sensor group, the plurality of different outputs being captured by the sensor group,
   perform image recognition processing on ones of the plurality of additional outputs,
   detect, from the image recognition processing performed, a movement range of a visual line of the user,
   determine if the movement range is less than or equal to a predetermined threshold,
      on a condition that the movement range is less than or equal to the predetermined threshold, determine that the work state is a first state,
      on a condition that the movement range is greater than the predetermined threshold, determine that the work state is a second state, and
   changes display of the work support information on the display device corresponding to the determined work state of the user.

* * * * *